US011587557B2

(12) United States Patent
Ross et al.

(10) Patent No.: US 11,587,557 B2
(45) Date of Patent: Feb. 21, 2023

(54) ONTOLOGY-BASED ORGANIZATION OF CONVERSATIONAL AGENT

(71) Applicant: INTERNATIONAL BUSINESS MACHINES CORPORATION, Armonk, NY (US)

(72) Inventors: Steven I. Ross, S Hamilton, MA (US); Stephanie Houde, Belmont, MA (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 17/034,031

(22) Filed: Sep. 28, 2020

(65) Prior Publication Data

US 2022/0101833 A1    Mar. 31, 2022

(51) Int. Cl.
*G10L 15/22* (2006.01)
*G10L 15/183* (2013.01)
*G10L 15/18* (2013.01)
*G10L 15/06* (2013.01)
*G06F 40/30* (2020.01)

(52) U.S. Cl.
CPC ........ *G10L 15/183* (2013.01); *G10L 15/1815* (2013.01); *G10L 15/1822* (2013.01); *G10L 15/22* (2013.01); *G06F 40/30* (2020.01); *G10L 15/063* (2013.01); *G10L 2015/0633* (2013.01); *G10L 2015/223* (2013.01); *G10L 2015/225* (2013.01)

(58) Field of Classification Search
None
See application file for complete search history.

(56) References Cited

U.S. PATENT DOCUMENTS

| 7,249,018 | B2 | 7/2007 | Ross | |
| 7,693,812 | B2* | 4/2010 | Lim | G06F 16/24564 |
| | | | | 707/999.001 |
| 8,214,219 | B2* | 7/2012 | Prieto | B60N 2/002 |
| | | | | 701/36 |

(Continued)

OTHER PUBLICATIONS

US 11,275,896 B2, 03/2022, Ray (withdrawn)*

(Continued)

*Primary Examiner* — Richard Z Zhu
(74) *Attorney, Agent, or Firm* — L. Jeffrey Kelly

(57) ABSTRACT

According to a first aspect of the present invention, a computer implemented method, a computer system and a computer program product for creating an ontological conversational agent, the method including creating an ontological specification of a domain of discourse of the ontological conversational agent, and creating a description of one or more goals of the ontological conversational agent. In an embodiment, the ontological description includes classes of entities, their associated attributes and relationships between the classes of entities. In an embodiment, the ontological description includes language-related descriptions. In an embodiment, the method, computer system and computer program product further includes creating a description of services of the ontological conversational agent. An embodiment including receiving a first utterance from a user during a conversation, identifying a first intent based on the first utterance, and recognizing a first goal of the one or more goals, based on the first intent.

20 Claims, 9 Drawing Sheets

(56) References Cited

U.S. PATENT DOCUMENTS

| | | | |
|---|---|---|---|
| 9,292,262 | B2 | 3/2016 | Gabel et al. |
| 9,922,642 | B2* | 3/2018 | Pitschel ................. G10L 15/22 |
| 10,002,189 | B2* | 6/2018 | Cheyer ................. G06F 16/367 |
| 11,023,513 | B2* | 6/2021 | Cheyer ................. G06F 16/334 |
| 2002/0095286 | A1 | 7/2002 | Ross |
| 2013/0138586 | A1 | 5/2013 | Jung et al. |
| 2014/0310001 | A1 | 10/2014 | Kalns et al. |
| 2016/0042735 | A1* | 2/2016 | Vibbert ............... G10L 15/1822 704/257 |
| 2020/0219503 | A1* | 7/2020 | He ........................ H04M 1/271 |
| 2021/0082422 | A1* | 3/2021 | Mondal ................. G10L 15/183 |
| 2021/0082425 | A1* | 3/2021 | Johnson ................. G10L 15/22 |
| 2022/0093088 | A1* | 3/2022 | Rangarajan Sridhar ..................... G06F 16/338 |

OTHER PUBLICATIONS

Altinok, "An Ontology-Based Dialogue Management System for Banking and Finance Dialogue Systems", Published in ArXiv 2018, Computer Science, 12 pages.

Al-Zubaide et al., "OntBot: Ontology based chatbot". Article ? Nov. 2011, researchgate, 4 pages.

Corradini et al., "Developing a Conversational Agent Using Ontologies", International Conference on Human-Computer Interaction, HCI 2007, Accessed on Apr. 27, 2020, 6 pages.

Mell et al., "The NIST Definition of Cloud Computing", Recommendations of the National Institute of Standards and Technology, Special Publication 800-145, Sep. 2011, 7 pages.

* cited by examiner

ONTOLOGY-BASED ORGANIZATION OF CONVERSATIONAL AGENT

BACKGROUND

The present invention relates to a computer implemented method, computer system and computer program product for a conversation agent. Specifically, the invention relates to an ontology-based conversational agent.

Conversational agents or chatbots are software applications which mimic human speech, either online or spoken, for purposes of simulating a conversation or interaction with a person. Conversational agents may be on-line or may be a standalone application.

Conventional conversational agent specifications represent agent context as a fixed set of variables and map a conversation flow as a tree of potential dialogue states. Generally, user utterances and input are analyzed for entities such as domain objects and intents for utterance classifications to inform and influence the progress of a conversation. This is simple in principle but does not scale well to a more realistic conversational agent. A disadvantage of conventional conversational agents is that domain knowledge is implicit and scattered through the conversational agent definitions. The conventional conversational agent definitions suffer from lack of modularity and are difficult to navigate and modify. Therefore, because of the above disadvantages, there is a need for a conversational agent which can more quickly identify a goal of a user interacting with the conversational agent and provide more accurate information more quickly to the user.

An advantage to an improved conversational agent would be to have the conversational agent specification easier to define and easier to update. This improvement will provide more pertinent information to a user more quickly and provide for a more flexible and natural interaction between the improved conversational agent and the user. This has an advantage of allowing the improved conversational agent to be more efficient and begin a next conversation within a shorter period of time, potentially allowing a single improved conversational agent to process more orders and generate greater sales for a sales entity using the improved conversational agent.

SUMMARY

According to a first aspect of the present invention, there is provided a computer implemented method, a computer system and a computer program product for creating an ontological conversational agent, the method including creating an ontological specification of a domain of discourse of the ontological conversational agent, and creating a description of one or more goals of the ontological conversational agent. An advantage of the ontological conversational agent is an organized ontological structural of the specification which identifies a hierarchy of information which in turn is easier to navigate during a conversation with a user and easier to update.

In an embodiment, the ontological specification includes classes of entities, their associated attributes and relationships between the classes of entities. An advantage of organizing the ontological specification into classes of entities, their associated attributes and relationships between the classes of entities is ease of programming for organization of related information for the specification.

In an embodiment, the ontological specification includes language-related descriptions, which has an advantage of assisting the conversational agent to recognize multiple descriptions and local vernacular of a particular item or idea.

In an embodiment, the method, computer system and computer program product further includes creating a specification of services of the ontological conversational agent, having an advantage of improving a conversation with a user by providing the specification of services to the user.

An embodiment including receiving a first utterance from a user during a conversation, identifying a first intent based on the first utterance, and recognizing a first goal of the one or more goals, based on the first intent. An advantage of receiving the first utterance, identifying a first intent and recognizing of first goal is to assist the user in their attempt to receive information and assist the conversational agent in helping the user attain their goal for the conversation.

An embodiment including retrieving one or more rules associated with the first goal, and generating a first response to the user based on the first intent, further including identifying needed information based on the first utterance and the first goal, and generating a first response to the user based on the needed information, which has an advantage of assisting the user to achieve the first goal.

An embodiment further including translating the first utterance to a language recognized by the ontological conversational agent, having an advantage of allowing a conversation between the conversational agent and the user to proceed in any language which the user may be interacting in.

An embodiment further including receiving a second utterance from the user during the conversation between the ontological conversational agent and the user, identifying a second intent based on the second utterance, and recognizing a second goal of the one or more goals of the ontological conversation agent based on the second intent. This has an advantage of further progressing a conversation between the user and the conversational agent and identifying a second goal for the conversation.

An embodiment further including retrieving one or more rules associated with the second goal, identifying further needed information based on the second utterance and the second goal, and generating a second response to the user based on the further needed information, having an advantage of having the conversational agent further being able to assist the user based on further information provided by the user.

An embodiment further including receiving a third utterance from the user during the conversation between the ontological conversational agent and the user, determining the second goal is accomplished, determining the first goal is not accomplished, repeating the generation of the first response to the user. This has an advantage of helping the conversational agent help the user by returning to the first goal after the second goal is accomplished.

An embodiment further including saving a conversation of user utterances and responses, and determining a current goal based on the saved conversation, having an advantage of assisting the user with a current flow of conversation and the direction the user has taken in the conversation.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
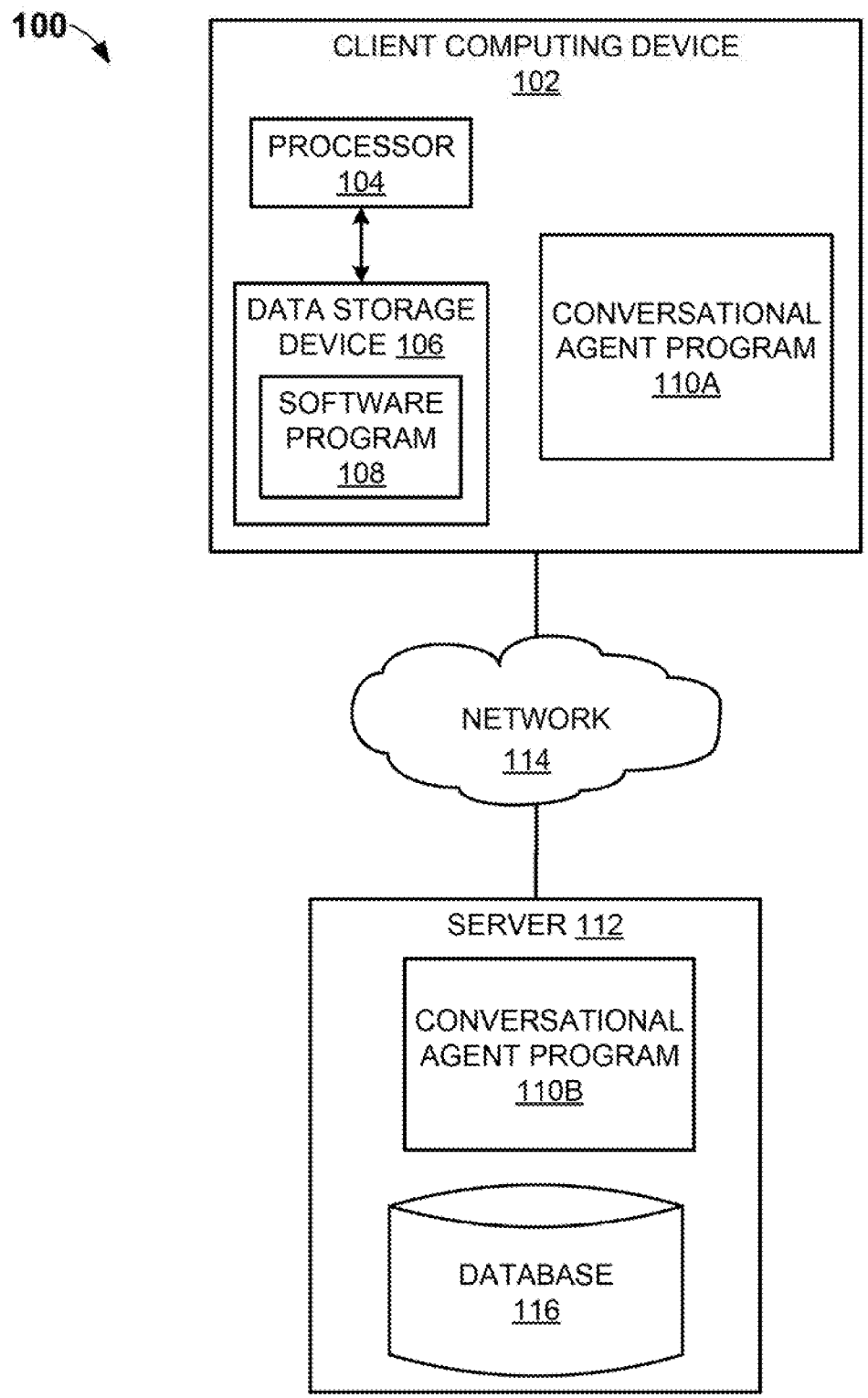
FIG. 1 depicts an exemplary networked computer environment according to an embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to a conversational agent. The following described exemplary embodiments provide a system, method, and program product to, among other things, provide a goal-directed reasoning with an ontological representation for a conversational agent. Therefore, the present embodiment has an advantage of a capacity to improve the technical field of conversational agents by using ontology to organize and modularize a conversational agent specification to be used during a conversation between a user and a conversational agent.

As previously described, conversational agents or chatbots are software applications which mimic human speech, either online or spoken, for purposes of simulating a conversation or interaction with a person or user. Conversational agents may be on-line or may be a standalone application.

Conversational agent specifications for products, such as IBM® Watson Assistant, Google DialogFlow® and Amazon™ Alexa™ Skills Framework, represent agent context as a fixed set of variables, and map a conversation flow as a tree of potential dialogue states. Generally, user utterances and input such as through an app or through a web page are analyzed for entities such as domain objects and intents for utterance classifications to inform and influence the progress of a conversation. This is simple in principle but does has a disadvantage of not scaling well to a more realistic conversational agent. A disadvantage of conventional conversational agents is that domain knowledge associated with these agents is implicit and scattered through agent definitions. The agent definitions suffer from lack of modularity and are difficult to navigate and modify. IBM® is a registered trademark of International Business Machines, Corp. DialogFlow® is a registered trademark of Google, LLC. Amazon™ and Alexa™ are trademarks of Amazon.com, Inc.

An advantage to an improved conversational agent would be to have the conversational agent specification easier to define and easier to update. This improvement will provide more pertinent information to a user more quickly and provide for a more flexible and natural interaction between the improved conversational agent and the user. This has an advantage of allowing the improved conversational agent to be more efficient and begin a next conversation within a shorter period of time, potentially allowing a single improved conversational agent to process more orders and generate greater sales for a sales entity using the improved conversational agent.

As such, it may be advantageous to, among other things, implement a system that uses a goal directed system which interprets the agent definition and conducts a conversation with the user. The language-specific information associated with ontological specification allows natural language processing, (hereinafter "NLP"), analysis to extract relational information and build a knowledge graph representation of utterances and context.

A disadvantage of a traditional conversational agent is its dependence upon pre-determined conversational transcripts which include a list of proposed statements or questions from a user, which may be imprecisely matched to representative scripted statements, and could follow a pre-specified interaction pattern that would vary depending on user responses. A satisfactory conversation between a user and the conversational agent is dependent upon the user only asking a variation of one of the scripted questions and an unscripted question too far outside a range of expected utterances may lead to an unsatisfactory conversation with unanswered questions.

An advantage of the new scheme for defining conversational agents consists of two main components. The first component is an ontological specification of a domain of discourse detailing classes of entities, their attributes and values that may be encountered by the agent. This includes language-related descriptions such as synonyms and syntactic forms in which they may appear, and includes a description of how such information may be asserted by the user or prompted for by the conversational agent when needed, or how the agent can derive this information through logical inference or calls to external services. The second component is a description of level goals, capabilities and services provided by the conversational agent. This includes how these goals may be triggered by user utterances and how these goals may be achieved procedurally. The goals may be ranked, with top-level goals having a greater priority for the conversational agent. For example, a goal of a user interacting with the conversational agent may be prioritized over a goal of the conversational agent.

The following described exemplary embodiments provide a system, method, and program product to create a goal directed conversational agent based on an ontological specification to extract relational information and build a knowledge graph representation of utterances and context.

An ontological specification includes a breakdown of structure of a domain with classes and subclasses and can be used as an object-oriented computer programming or knowledge engineering concept. An ontology encompasses a representation, with formal naming and definition of categories, properties and relations between concepts, data and entities that substantiate one, many or all domains of discourse. An ontology is a way of showing properties of a subject area and showing how they are related, by defining a set of concepts and categories that represent the subject area.

Using the ontological specification in a conversational agent organizes information and provides knowledge in a menu taxonomy unlike current conversational agents. Conversational agents using an ontological specification have the ability to provide information in a classification hierarchy which the conversational agent uses to provide meaningful information and achieve conversation goals, such as complete an online transaction.

A conversational agent constructed in this manner can support a variety of conversational interaction patterns, such as simple question answering and command execution, and can also automatically ask questions to ascertain needed information, and handle complex utterances dealing with multiple related objects and attributes. It can automatically handle variations in patterns depending on the optional or required nature of attributes, and properly deal with the arity of relations.

Digression from and resumption of goal-directed inquiry, and user control of the conversation can also be easily supported in this scheme. Conversational agents made with the ontological specification would never "get stuck" in an endless loop or demand a user response, such as may occur with a traditional non-ontological based agent. This is because the goal-directed conversation that arises from the interpretation of the ontological specification is an emergent property based on recent input from the user and is not a pre-scripted conversation as may be dictated by conventional conversational agents.

Referring to FIG. 1, an exemplary networked computer environment 100 is depicted, according to an embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a conversational agent program 110A and communicate with the server 112 via the communication network 114, in accordance with an embodiment of the invention. Client computing device 102 may be, for example, a mobile device, a telephone, a personal digital assistant, a netbook, a laptop computer, a tablet computer, a desktop computer, or any type of computing device capable of running a program and accessing a network.

The server 112 may be a laptop computer, netbook computer, personal computer (PC), a desktop computer, or any programmable electronic device or any network of programmable electronic devices capable of hosting and running a conversational agent program 110B and a database 116 and communicating with the client computing device 102 via the communication network 114, in accordance with embodiments of the invention. As will be discussed with reference to FIG. 6, the server 112 may include internal components and external components, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the conversational agent program 110A, 110B may be a program capable of defining or authoring a conversational agent based on an ontological specification of a domain of discourse and using a description of top-level goals.

In an embodiment, the agent authoring tool may reside on the client computing device 102 and communicates with the server 112 to update the agent model. Once defined, the agent model could be stored in the database 116 on the server 112, or may be stored on the data storage device 106 on the client computing device 102 to be stored locally.

In an embodiment, the conversational agent program 110A, 110B communicates with a client user experience application, for example on the client computing device 102, which could be a web-browser based chat facility or a client application. The client user experience application interacts with the user, collecting input utterances and displaying conversational responses sent by the server 112. In our current embodiment, the server 112 is stateless; the conversational context, including utterances and knowledge graph are passed back from the server 112 to the client via the client computing device 102 with each server 112 response, and returned to the server 112 with each user utterance.

The conversational agent program 110A, 110B may be located on server 112. Alternatively, the conversational agent program 110A, 110B may be located on client computing device 102 or on any other device located within network 114. Furthermore, the conversational agent program 110A, 110B may be distributed in its operation over multiple devices, such as client computing device 102 and server 112. The conversational agent method is explained in further detail below with respect to FIGS. 2-9.

Figure 2:
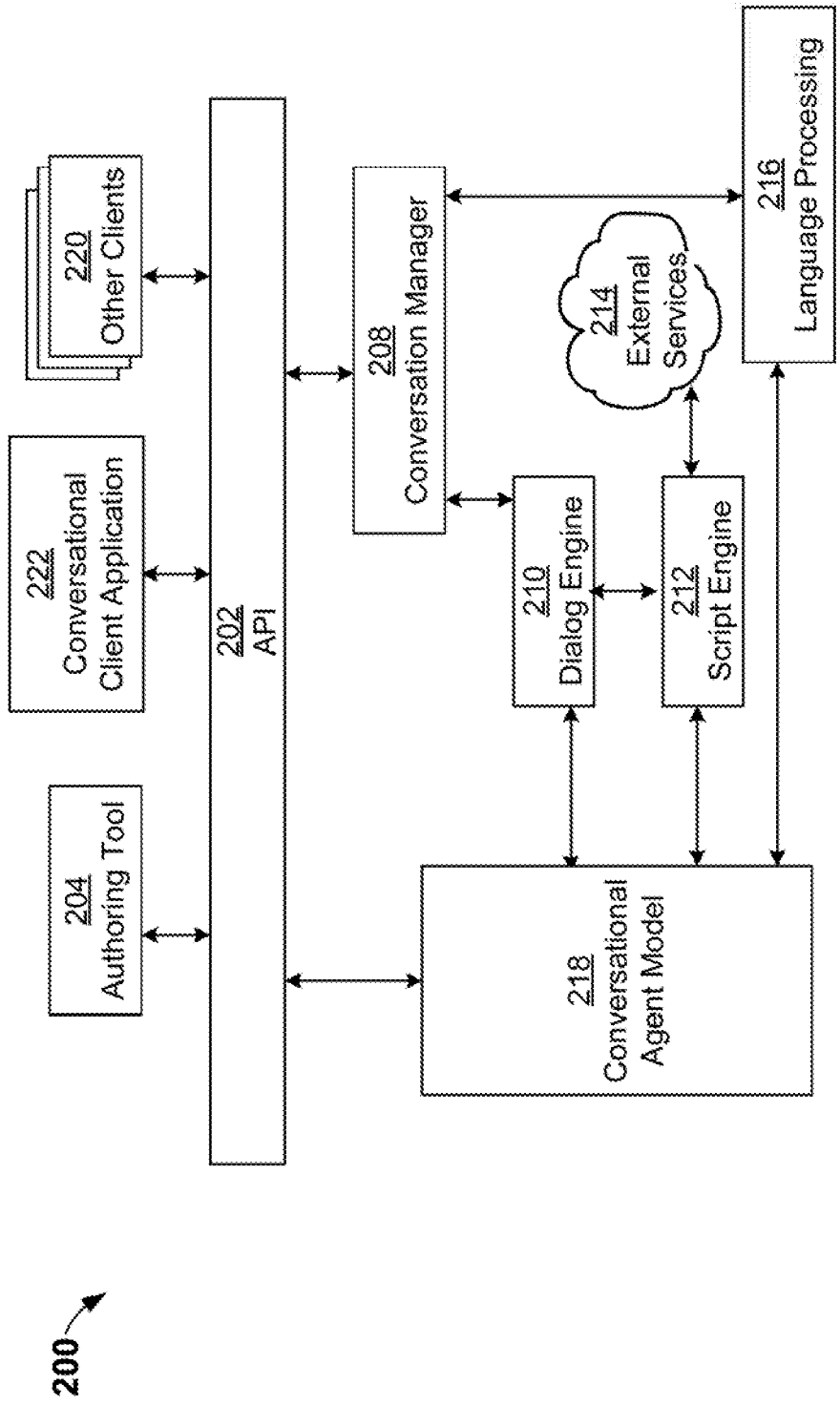
FIG. 2 is a schematic diagram of a system architecture, according to an embodiment.

Referring now to FIG. 2, a system 200 for creating an ontological conversational agent specification and for implementing the conversational agent is shown, according to embodiment. The system architecture 200 includes an application programming interface, (hereinafter "API" 202), an authoring tool 204, a conversational agent model 218, a conversation manager 208, a dialog engine 210, a script engine 212, external services 214, natural language processing 216, conversational client application 222 and other clients 220.

The API 202, the conversational agent model 218, the dialog engine 210, the script engine 212, the conversation manager 208, the natural language processing 216 and the conversational client application 222 may each be running on a server, such as the server 112 of FIG. 1. The authoring tool 204 and the other clients 220 may each be separate web applications.

The API 202 is a computer interface which defines interactions between software programs. The authoring tool 204, the other clients 220, the conversational agent model 218 and the conversational client application 222 may each have access to the API 202.

The API 202 provides programmatic services that other programs, such as the conversational agent model 218, the dialog engine 210, the script engine 212, the conversation manager 208, the natural language processing 216 and the conversational client application 222 can utilize to communication with each of the other programs.

The authoring tool 204 is a separate web application which allows a programmer to create content for an ontological conversational agent. The programmer creates the ontological conversational agent by creating the ontological classes and goals which guide the conversational agent to engage in a conversation with a user. The programmer enumerates the attributes associated with each class, and specifies the value classes associated with those attributes along with their other characteristics such as optional or required, single or multiple, and provides examples of how these values can be asserted by the user or asked for by the agent. In addition, the programmer specifies rules that the agent can follow to achieve individual goals or ascertain values associated with the ontology. The programmer performs testing to ensure the conversational agent works properly.

Ontology is a set of concepts and categories organized as classes and subclasses in a subject area or domain which show properties and relationships between the properties. Rules that the conversational agent can follow to ascertain values include a way to figure out information that the conversational agents needs to accomplish goals. For example, a particular rule for achieving a goal requires that the individual in question must be older than a certain age. Age would be a property of a person in the ontology, and the system would have ways specified in the ontology to ascertain the age of a person. One easy way might to ask the person for their age, and the appropriate prompts would be specified. "How old are you?", for example. There might be other ways of finding the age of a person, such as looking it up in a database, and there could be rules describing how to do that and under what circumstances to do that instead of just asking" associated with the age property in the ontology.

The conversational agent model 218 is a class of computational models used to specify the knowledge and behavior of a conversational agent. The conversational agent model 218 captures the goals and ontology of the conversational agent as defined by the authoring tool 204. The conversational agent model 218 may communicate with the dialog engine 210, the script engine 212, the conversational agent 218 and the natural language processing 216. The conversational agent model 218 makes program calls into the system 200 to define the model of the conversational agent, creating the conversational client. The conversational agent model 218 makes program calls through the API 202 to carry on a conversation by providing responses of information and questions in response to utterance and text information received from the user between the conversational agent or chat bot and the user.

The conversational agent may include the agent model 206, the dialog engine 210, the conversational agent model 218 and the conversation manager 208. There may be additional conversational agents available, for example for different stores, services, educational, governmental facilities, etc., and may be stored, for example in the database 116 of FIG. 1.

The conversational client application 222 is connected to the API 202 and provides a user interface for a user to interact with the conversational agent. The conversational client application may indicate which conversational agent it wishes to communicate with and direct an initial conversation input to a corresponding conversational agent for processing the users input. Alternatively, the client or user may load a particular conversational agent and subsequently interact with it. A particular conversational agent may also transfer a user conversation to a different conversational agent upon determination that the different conversational agent is better suited for the user interaction.

The script engine 212, the external services 214 and the natural language processing 216 may be used by the system but are not necessarily an internal part of the conversational agent.

The conversation manager 208 is a contact center solution which creates coherent customer communications with a user, and may communicate on the internet, on a mobile phone, on a chat, through an interactive voice response, or other method of communication. The conversation manager 208 may communicate with the dialog engine 210 and the natural language processing 216.

The dialog engine 210 is a computer system which converses with a person or user using text, speech, graphics and other modes of communication on both an input and an output channel. The dialog engine 210 interprets the conversational agent model 218 with respect to the conversation that is occurring. The dialog engine 210 communicates with the conversation manager 208, the conversational agent model 218 and the script engine 212.

The script engine 212 is part of the system that interprets imperative functional specifications that are included in the conversational agent model and are accessed by rules within the conversational agent specification and enables additional functionality and access to external services to be added to the agent. The script engine 212 communicates with the external services 214, the conversational agent model 218 and the dialog engine 210.

The external services 214 may be additional services utilized by the conversational agent model 218, and communication may be similar to the communication network 114 of FIG. 1.

The natural language processing 216 interprets a verbal utterance or a written statement from the user, providing intent detection, and entity and relation extraction.

The other clients 220 are one or more applications that may communicate through the API 202. The other clients 220 may include additional communication agents, for example, each of the other clients 220 may be a specific ontological conversational agent equipped for a specific topic. Specific topics may be different types of stores or restaurants, for example, a Chinese restaurant, an Italian restaurant, a coffee shop, a bookstore, an insurance agent, an automotive repair shop, a university, a government agency, etc.

Figure 3:
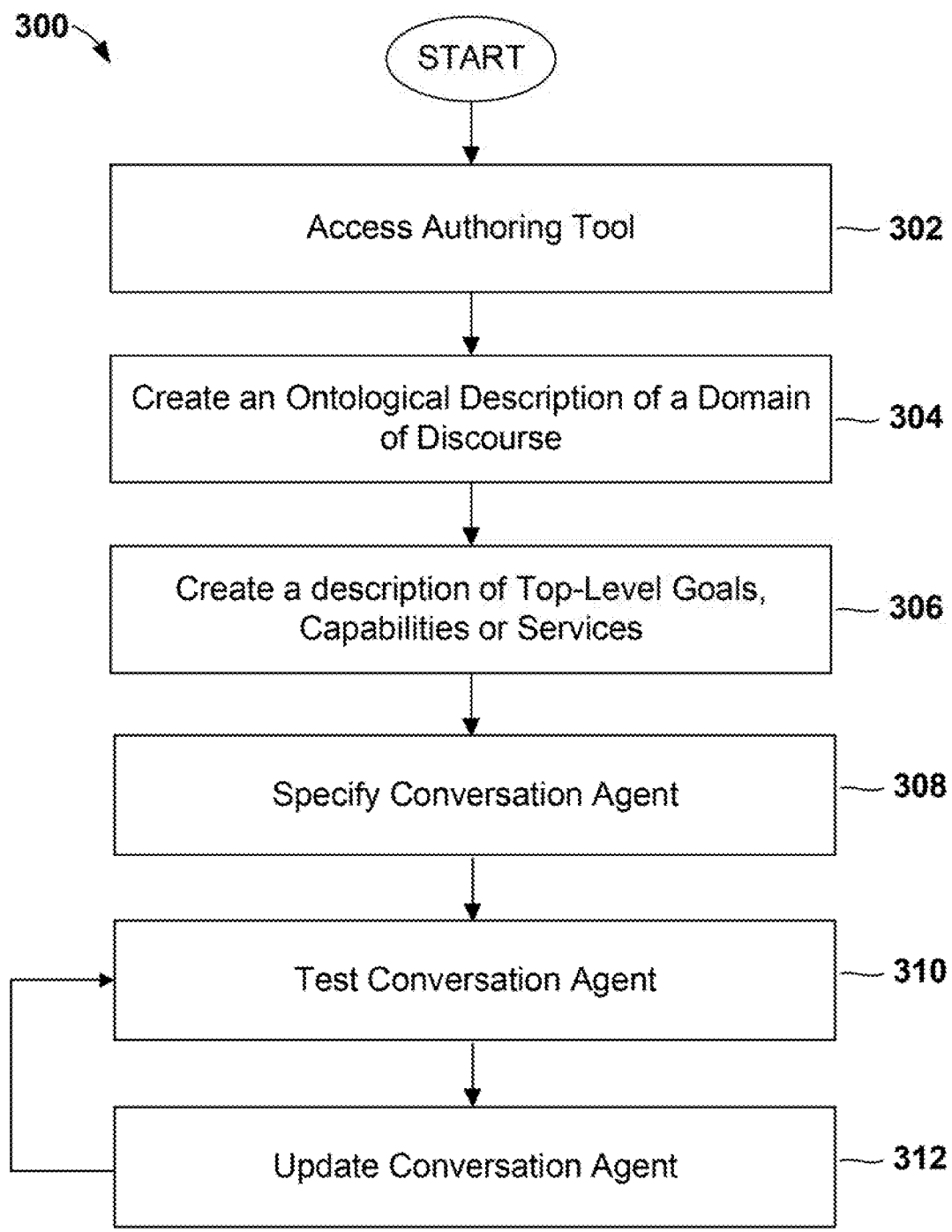
FIG. 3 depicts an operational flowchart illustrating a conversational agent defining process, according to an embodiment.

Referring now to FIG. 3, an operational flowchart 300 illustrating a conversational agent defining process is depicted according to an embodiment.

The flowchart 300 begins with accessing the authoring tool 204 of FIG. 2, step 302. A programmer or a consultant may be tasked with modeling the ontological conversational agent and would access an application for the authoring tool 204.

Next, an ontological specification of a domain of discourse is created, step 304. The ontological description includes classes of entities, their attributes, their relationships to other classes and values that these attributes can take on. This includes language-related descriptions such as synonyms and syntactic forms in which they may appear, and includes a description of how such information may be asserted by the user or prompted for by the conversational agent when needed, or how the agent can derive this information through logical inference or calls to external services. The ontological specification may be stored at the authoring tool 204 while being created.

The ontological specification may be created by organizing information into a hierarchical or tree format. For example, a conversational agent specification for a store may include a first level of a hierarchy of goals and knowledge. A second level hierarchy of goals may include items such as start, greetings, place an order, etc. Each of these second level hierarchy of goals may have further information. A second level hierarchy of knowledge may include items such as item, order, topping, and further information for each. A third level hierarchy of knowledge and item may include pizza, salad and drink. A fourth level hierarchy of knowledge, item and pizza may include size and toppings.

Values may be possible attributes for a class of entities. A class of entities may have members defined in the ontology. For example, values may include the kinds of dressings available for a salad, or cities that an airline fly to. Entities may be members of the specified class, and they are the kinds of values that might be associated with an attribute relation that maps from an entity that is a member of a particular class to an entity of the attribute's value class. For example, a pizza has a size attribute which is associated with a Size class which has entities "large", "medium", and "small" associated with the pizza. If a pizza is specified to have a size attribute of class Size, it can be represented in the knowledge graph by a size relation mapping from a pizza to a Size, i.e. to a "large", "medium", or "small", entity.

Next, a description of top-level goals, capabilities and services provided by the conversational agent is created at step 306. This includes how these goals may be triggered by user utterances and text input and rules for how these goals may be achieved. The conversational agent specification which includes the goals, capabilities and services may be stored in the database 116 of the server 112 as shown in FIG. 1. The level goals of the conversational agent may be to answer a question, such as provide an address or a stock price, to receive an order for an item, among other goals. The capabilities of the conversational agent may be defining what information is available and which types of things may be ordered.

The domain specification explicitly describes the topics that may be discussed between a user and the conversational agent and how these things relate to each other. The domain specification includes information regarding how the user will talk about these things, such as how does one make an assertion about some property of a particular kind of object, for example, and how might the agent ask for that property if needed, or otherwise obtain the value for that property from external services. The scripts are possible inputs from a user, such as "What is the store address?" and "What is the stock price of a particular company?"

The rules are associated with goals and attribute elements and provide ways to achieve those goals or to determine those attributes. In our embodiment rules have conditions that express what conditions must be met in order for the rule to be applicable, and actions that can be executed if those conditions are met. These actions might make modifications to the knowledge graph context, make calls to external services (e.g. to place an order or effect some other actions in the world) or communicate a question or answer to the end-user.

At step 308, implementation of the conversational agent may be performed by specifying the ontology of the goals, the rules and the scripts of the conversational agent.

The specification includes how to achieve goals as condition-action rules which refer to the state of a knowledge graph that conforms to a domain specification ontology. The rules include values of properties of objects that belong to the classes defined in the domain specification. The rules specify values if the values are present. If the values are not present, the conversational agent may request a value as defined as part of the domain specification. Rules are interpreted in a goal directed manner, so conditions in a rule that are unmet but not contradicted by assertions in the context knowledge graph become subgoals which are then pursued by the dialog engine in a recursive fashion. This may lead to the agent asking the user a question to resolve the missing information or making calls to external services to resolve it.

Following, at step 310, testing of the conversational agent may be performed. This may include using a fictional conversation which includes possible inputs from a user and ensuring the conversational agent responds appropriately, making sure that a goal of the user is obtained, and the conversational agent is able to interpret input correctly.

Updating to the specification of the conversational agent may be done at step 312, based on user feedback, and based on updates necessary as the information in the domain of discourse and level goals may be changed over time. Updating the specification may include updating a menu with new items, removal of old items, updating pricing, updating store hours, adding a second location to a store, updating a link to a website, making corrections of any information, adding new variations of speech patterns, adding a new language, updating reference material, making corrections, among other things. Following updating the conversational agent, step 312, the flowchart may return to testing the conversational agent, step 310.

Figure 4:
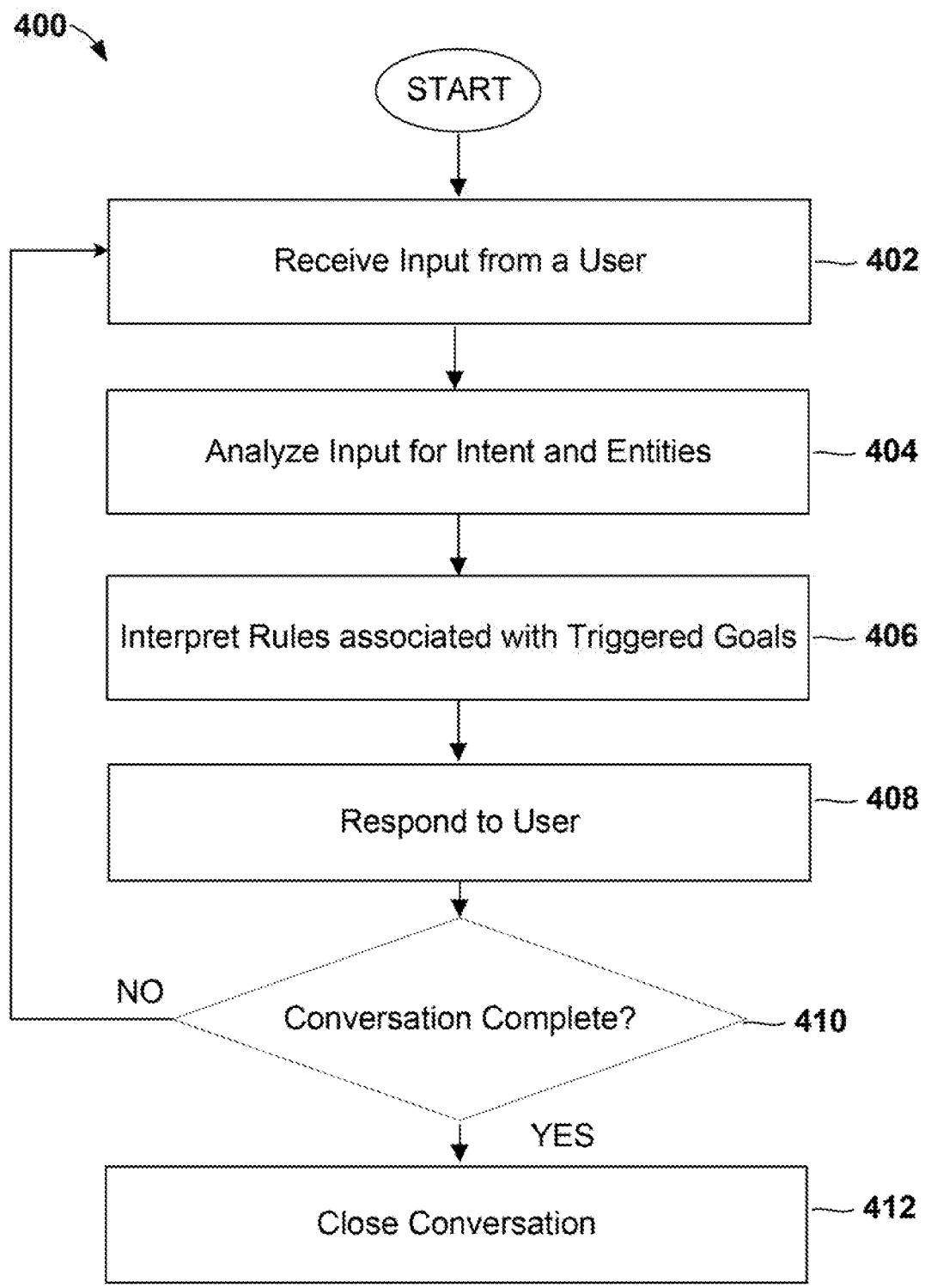
FIG. 4 depicts an operational flowchart illustrating a conversational agent operation process, according to an embodiment.

Referring now to FIG. 4, an operational flowchart 400 illustrating a conversational agent operation process is depicted, according to an embodiment.

The flowchart 400 begins with a user providing input, step 402. The user may access the conversational agent through an app which communicates through the API 202 or through external services 214. External services 214 include outside programs which the conversational agent can use to get information or perform actions such as looking something up in a database, getting stock or weather information, or placing an order. Access to a conversation client application 222 may occur through the API 202 by the conversational agent model 218 or by Other Clients 220. The conversational agent infrastructure may be usable by other programs to provide conversation services as part of their overall function.

The user may access the conversational agent through a web page, for example, a web page of a store or other institution. The user may access the conversational agent through a telephone call, or other method. The input from the user may be text written by the user in the app or web page, or other method. The input from the user may be a verbal communication, for example through a telephone call transcribed by a speech recognition algorithm by the Natural Language Processing 216. The conversation manager receives input with context information from the user, invokes the natural language processing 216 on the utterance, and determines what to do. It may determine the utterance is an answer to an outstanding question and assert it as such, or determine the utterance identifies a new goal, which may be asserted into the context. The conversational agent may then invoke the dialog engine 210 to determine what to do next and how to respond. As a stateless system, the information that comes through the API 202 is sufficient to establish which conversational agent the user is conversing with and what a current state of the conversation is, such as beginning, in progress, completed.

Next, the input is analyzed for intent and entities, step 404. The conversation manager uses the natural language processing 216 to analyze the user utterance and then make an assertion of goals and/or relations into the dialog engine 210. The dialog engine 210 then interprets the conversational agent model 218 using the script engine 212 with respect to the conversation that is occurring. A determined goal may be pushed onto a goal stack and new information and relations asserts into a context memory.

The input is then compared with interpreted rules associated with triggered goals as stored in the conversational agent model 218, step 406. The input may be analyzed for relation to the ontological knowledge stored in the conversational agent model 218 and extracted based on syntactic dependency analysis and ontological descriptions. A recognized intent may trigger a goal of the conversational agent, for example, to have a Pizza Bot take an order for a Pizza Shop.

The dialog engine 210 may then resume its suspended processing on the top level goal (which may or may not have changed as a result of the last utterance), in light of the new information in its context memory (the knowledge graph). The dialog engine 210 does this by considering the rules associated with the current goal and evaluating their conditions relative to the context memory. If the conditions are all met, then the rule fires and actions of the rule are executed. These actions may result in changes to the context memory, responses or questions to the user, execution of script functions, or changes to the dialog engine state. The conditions are evaluated to determine whether the rule is applicable. This may involve recursive pursuit of subgoals to determine needed additional information, but when that process is done it is determined that the condition has been met or not. If not, the conversational agent continues on to other rules that may be applicable. If the conditions are met, then the rule is considered to "fire", and the actions associated with the rule are executed.

A complete conversation of inputs from the user and responses to the user may be saved and considered in context for comparison of an input with the interpreted rules and goals. The user may respond to a question sent to the user, or the user may issue other commands or ask questions or give alternate commands that trigger digressions that can be answered or responded to before resuming work on any prior goals of the goal stack.

Next, a response is generated by the dialog engine 210, and communicated to the conversation manager, which forwards the response to the user through the API 202. The response would be output through the same channel as the input was received, for example through an app, through a web page or a verbal response through a telephone call. The response to the user may be an answer to a question, for example, for the Pizza Bot, a question may be "Where is the Pizza Shop located?" In this case, the response would be an address. An interpretation of rules associated with the triggered goals may introduce new sub-goals to ascertain needed missing information, potentially generating a response including a question based on the ontological descriptions. For example, the user may indicate that they wish to order a pizza. The response to the user may be a question, "What size pizza would you like to order?"

A determination may be made if the conversation is complete, step 410. For example, if a question is answered, and there are no further questions within a pre-determined period of time (for example, 5 minutes), the conversation may be considered complete. In another embodiment, if the user has completed a transaction, for example a pizza order, then the user may follow up with additional questions or information, or may say that they are done or end the conversation. When the conversation is considered complete, the flow continues to step 412.

If a determination is made that the conversation is not complete, then the flow returns to step 402, receive input from the user. For example, a question was sent to the user "What size pizza would you like to order?", and an input from the user is expected in response to the question. In some applications, conversations never complete. In others, detecting the end of a conversation may be based on the contents of the conversation itself or as you say due to a timeout, and the context should then be marked as complete so that no further interaction occurs.

At 412, the conversation may be ended and, if applicable, a user order or intent may be forwarded to an applicable party. For example, the user may complete the transaction to order a pizza, and the pizza order is sent to a server, for example through external services 214, which in turn is sent to the pizza shop, along with any payment information. In another embodiment, the user may provide some directive, such as requesting particular information or providing requested information. This information may be forwarded to the proper party for further handling of the information. In some cases, the conversation may end without any further action. For example, the user requested information which was provided and the conversation is concluded. In an embodiment, the conversational agent may say 'goodbye' and, for example, end a telephone conversation or disable the chat interface.

In an embodiment, a user utterance via voice or text may be translated into a language recognized by the conversational agent. Furthermore, a response to the user may be translated back into the original language provided by the user.

A record of the interaction between to and from the user may be saved for future reference, for debugging, and for other purposes.

Figure 5:
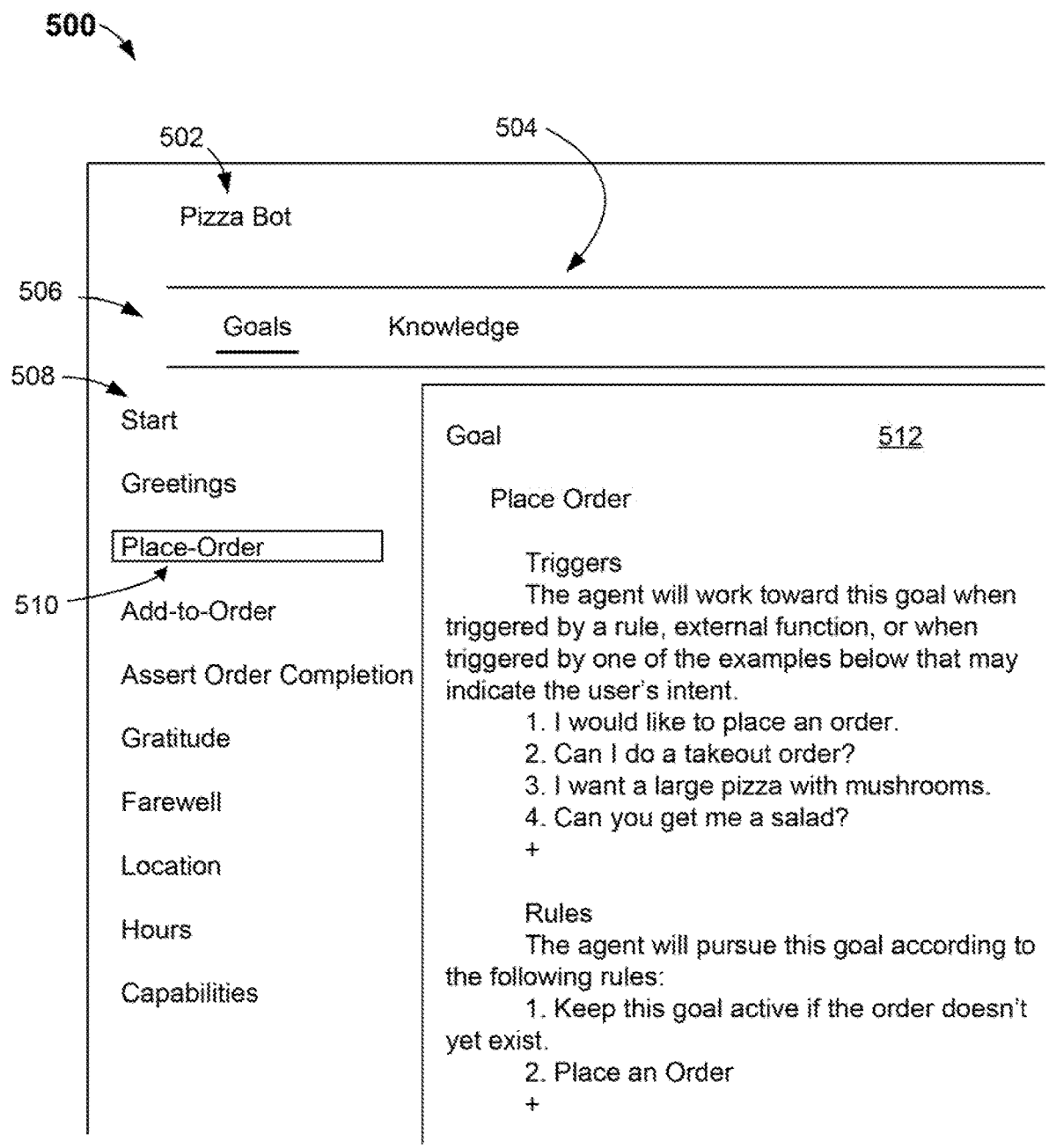
FIG. 5 depicts a goal representation screen of a conversational agent, according to an embodiment.

Referring now to FIG. 5, an illustration of a goal representation screen 500 of a conversational agent authoring system is shown, according to an embodiment.

The goal representation screen 500 describes top-level goals or services that the conversational agent can provide. The goal representation screen 500 provides associated phrases that may trigger goals and provides rules for attaining the goals. The goal representation screen 500 may be referred to as a tree or an outline view as a path may follow down a brank of the tree or along the outline.

The goal representation screen 500 includes a bot identifier 502, a top navigation menu 504, a selected top navigation menu item 506, a goals left navigation menu 508, a selected left navigation menu item 510 and a main content area 512.

The bot identifier 502 is a name of a particular conversational agent. In this example, the bot identifier 502 illustrates a Pizza Bot, which may be used for a pizza restaurant.

The top navigation menu 504 identifies tabs for different elements of the conversational agent. In this example, the Pizza Bot includes the elements of the top navigation menu 504 of Goals and Knowledge. In this example, the classes for the Pizza Bot are Goals and Knowledge, the elements of the top navigation menu 504.

Goals includes options for the Pizza Bot to accomplish or services to provide. Knowledge is the information of the Pizza Bot, including the ontological descriptions of the pertinent information for the domain of discourse.

The selected top navigation menu item 506 in this example is Goals, which is shown with an underline to indicate it is the selected top navigation menu item 506.

The left navigation menu 508 is a list of selections specific to the selected top navigation menu item 506. In this example, Goals is the selected top navigation menu item 506, as shown by the underline under Goals. The conversational agent contains information that someone may wish to ask the conversational agent. In this example, someone may ask questions about ordering pizza. The information related to ordering pizza is organized in the Pizza Bot and is shown in the goals left navigation menu 508. The goals left navigation menu 508 for the selected top navigation menu item 506 Goals includes Start, Greetings, Place-Order, Add-to-Order, Assert Order Completion, Gratitude, Farewell, Location, Hours and Capabilities. The items in the left navigation menu 508 in this example are sub-classes of the class of Goals.

For example, a person may ask "what are the shop hours?" The Pizza Bot is organized to have this information under "Hours" in the goals left navigation menu 508.

The conversation bot may start with basic information, for example a response to basic questions people may ask, such as "what can I say", "who are you", "how does this work", and then build on more information for customization, for example the Pizza Bot. The person building this would decide additionally, what functions do I want this to provide, what information is needed in order to do that.

The left navigation agent 508 for goals has a list of items specified for Goals, which is the top navigation menu item 506 selected item. The list of items specified for Goals are specific to the particular agent application. As shown in this example, the left navigation agent 508 lists: Start, Greetings, Place-Order, Add-to-Order, Assert Order Completion, Gratitude, Farewell, Location, Hours and Capabilities. Except for "Start", these are specific to the particular agent application. Every agent has a start goal, which is executed at the beginning of a conversation, and gives the agent a chance to begin by saying hello and identifying itself, if desired. The agent developer gets to specify what (if anything) happens in the start goal. In some embodiments, additional default goals could be provided, with some default definitions as well, to handle common conversational agent tasks, such as handling common conversational niceties, cancelling ongoing goals, refusing to answer a question, etc.

The selected left navigation menu item 510 is identified by a box surrounding Place-Order. Correspondingly, the main content area 512 shows information related to Place-Order.

The main content area 512 identifies it for Goals: Place Order and shows information on triggers and rules. The triggers will include information for this goal, with further information available when the + sign is pressed. It may show items such as, the user has said they want to place an order, the user has asked questions such as 'what pizza toppings are available', and other statements by the user. The rules state "The agent will pursue this goal according to the following rules . . . ".

Each of the items shown in the goal representation screen 500 including the bot identifier 502, the items of the top navigation menu 504, the items of the goals left navigation menu 508 relative to each of the top navigation menu 504 items, are all defined during the conversational agent defining process 300.

Figure 6:
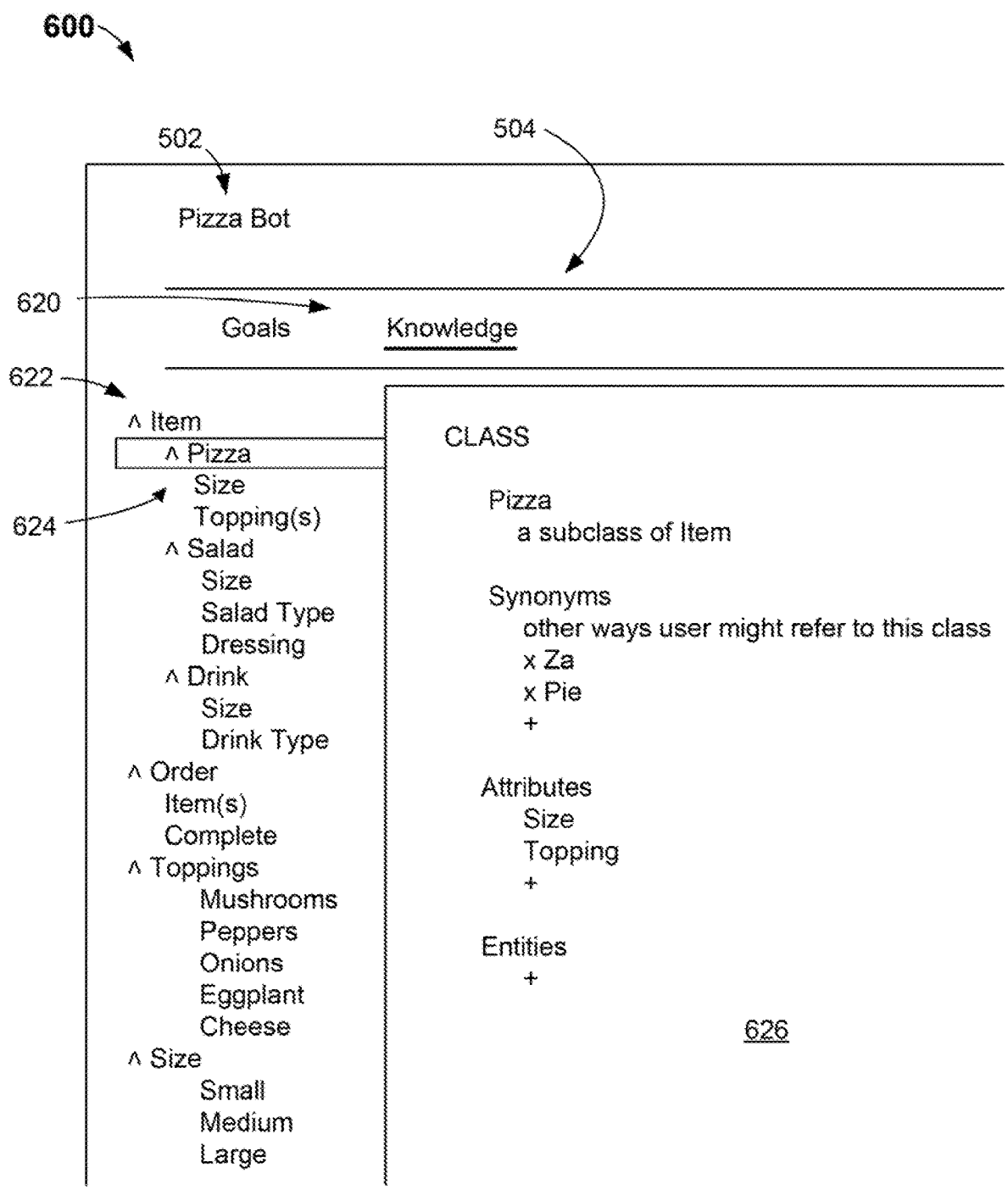
FIG. 6 depicts a domain representation screen of a conversational agent, according to an embodiment.

Referring now to FIG. 6, an illustration of a domain of knowledge representation screen 600 of a conversational agent is shown, according to an embodiment.

The domain representation screen 600 provides a description of the aspects of the world that the agent is prepared to converse about. The domain representation screen 600 describes classes of entities that will be encountered and their attributes and value types. The domain representation screen 600 provides associated synonyms, syntactic forms, prompts and assertions, and rules. The domain representation screen 600 provides descriptions of individual entities and allows inclusion of specific domain knowledge.

The domain representation screen 600 includes the bot identifier 502, the top navigation menu 504, a selected top navigation menu item 620, a knowledge left navigation menu 622, a knowledge selected left navigation menu item 624 and the main content area 626.

The bot identifier 502 is the name of a particular conversational agent. In this example, the bot identifier 502 illustrates the Pizza Bot.

The top navigation menu 504 identifies tabs for different elements of the conversational agent. The selected top navigation menu item 620 in this example is Knowledge, which is shown with an underline to indicate it is the selected top navigation menu item 620. Knowledge is the class in this example.

The knowledge left navigation menu 622 is a list of selections specific to the selected top navigation menu item 620. In this example, Knowledge is the selected top navigation menu item 622. The knowledge left navigation menu 622 for the selected top navigation menu item 620 includes Item, Order, Toppings and Size. Selectable items under Item include Pizza, Salad and Drink, and each of these items have further sub-menu items. Selectable items under Order include Item(s) and Complete. Selectable items under Toppings include Mushrooms, Peppers, Onions, Eggplant and Cheese. Selectable items under Size Small, Medium and Large. The items in the left navigation menu 622 in this example are sub-classes of the class of Knowledge.

The selected left navigation menu item 624 is identified by a box surrounding Pizza under Item. Correspondingly, the main content area 626 shows information related to Ordering a Pizza, such hierarchical information that Pizza is a subclass of Item, and synonyms of Pizza, attributes of Pizza and other information. For example, someone may refer to a pizza as Za or Pie when ordering a pizza.

Each of the items shown in the goal representation screen 600 including the bot identifier 502, the items of the top navigation menu 504, the items of the knowledge left navigation menu 622 relative to each of the top navigation menu 504 items, are all defined are all defined during the conversational agent defining process 300.

It may be appreciated that FIGS. 1-6 provide only an illustration of an implementation and does not imply any limitations with regard to how different embodiments may be implemented. Many modifications to the depicted environments may be made based on design and implementation requirements.

Figure 7:
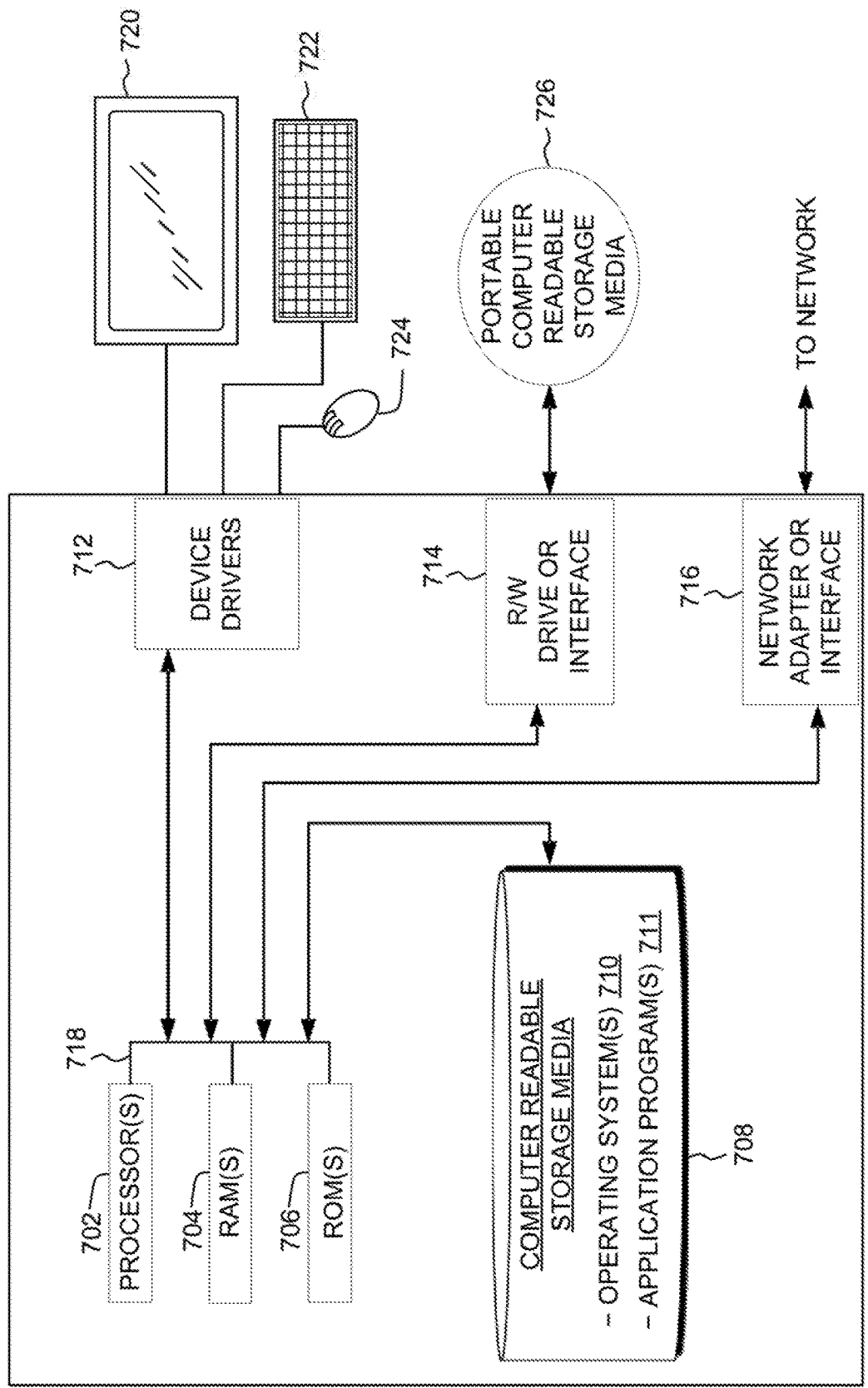
FIG. 7 depicts a block diagram of internal and external components of computers and servers depicted in FIG. 1 according to an embodiment.

Referring now to FIG. 7, a block diagram of components of a computing device, such as the client computing device 102 and the server 112 of FIG. 1, in accordance with an embodiment of the present invention is shown. It should be appreciated that FIG. 7, provides only an illustration of an implementation and does not imply any limitations with regard to the environments in which different embodiments may be implemented. Many modifications to the depicted environment may be made.

The computing device may include one or more processors 702, one or more computer-readable RAMs 704, one or more computer-readable ROMs 706, one or more computer readable storage media 708, device drivers 712, read/write drive or interface 714, network adapter or interface 716, all interconnected over a communications fabric 718. Communications fabric 718 may be implemented with any architecture designed for passing data and/or control information between processors (such as microprocessors, communications and network processors, etc.), system memory, peripheral devices, and any other hardware components within a system.

One or more operating systems 710, and one or more application programs 711 are stored on one or more of the computer readable storage media 708 for execution by one or more of the processors 702 via one or more of the respective RAMs 704 (which typically include cache memory). For example, the conversational agent program 110A, B, may be stored on the one or more of the computer readable storage media 708. In the illustrated embodiment, each of the computer readable storage media 708 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include the R/W drive or interface 714 to read from and write to one or more portable computer readable storage media 726. Application programs 711 on the computing device may be stored on one or more of the portable computer readable storage media 726, read via the respective R/W drive or interface 714 and loaded into the respective computer readable storage media 708.

The computing device may also include the network adapter or interface 716, such as a TCP/IP adapter card or wireless communication adapter (such as a 4G wireless communication adapter using OFDMA technology). Application programs 711 may be downloaded to the computing device from an external computer or external storage device via a network (for example, the Internet, a local area network or other wide area network or wireless network) and network adapter or interface 716. From the network adapter or interface 716, the programs may be loaded onto computer readable storage media 708. The network may comprise copper wires, optical fibers, wireless transmission, routers, firewalls, switches, gateway computers and/or edge servers.

The computing device may also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714 and network adapter or interface 716 may comprise hardware and software (stored on computer readable storage media 708 and/or ROM 706).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
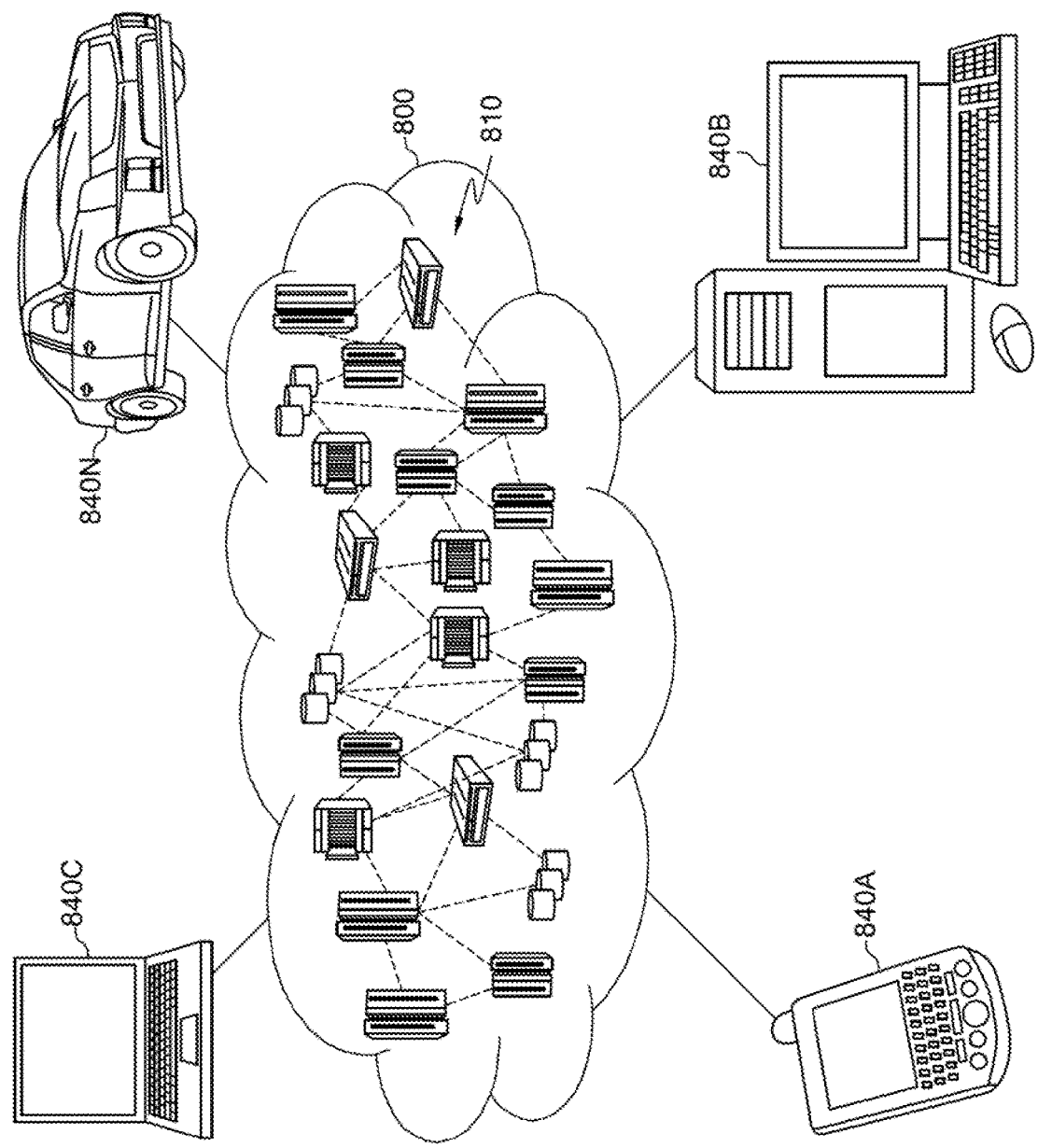
FIG. 8 depicts a cloud computing environment according to an embodiment.

Referring now to FIG. 8, illustrative cloud computing environment 800 is depicted. As shown, cloud computing environment 800 includes one or more cloud computing nodes 810 with which local computing devices used by cloud consumers, such as, for example, personal digital assistant (PDA) or cellular telephone 840A, desktop computer 840B, laptop computer 840C, and/or automobile computer system 840N may communicate. Cloud computing nodes 810 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 840A-N shown in FIG. 8 are intended to be illustrative only and that cloud computing nodes 810 and cloud computing environment 800 can communicate with any type of computerized device over any type of network and/or network addressable connection (e.g., using a web browser).

Figure 9:
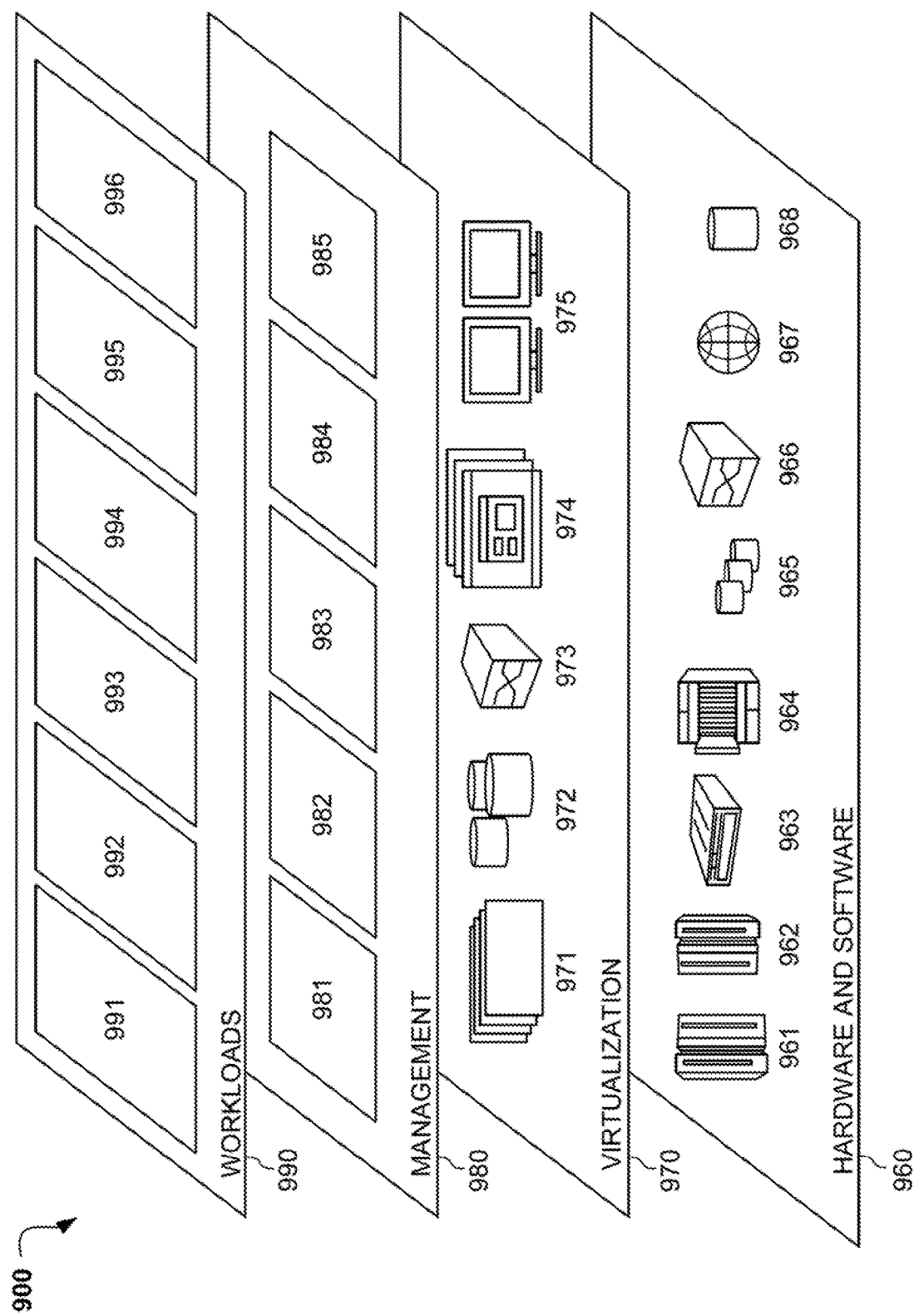
FIG. 9 depicts abstraction model layers according to an embodiment of the present invention.

Referring now to FIG. 9, a set of functional abstraction layers provided by cloud computing environment 800 (as shown in FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972, for example the data storage device 106 as shown in FIG. 1; virtual networks 973, including virtual private networks; virtual applications and operating systems 974; and virtual clients 975.

In an example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and ontological conversational agent 996. The ontological conversational agent may manage a conversation between a user and the agent to achieve goals of the conversation agent.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for creating an ontological conversational agent, the method comprising:
creating an ontological specification of a domain of discourse for the ontological conversational agent, the ontological specification of a domain comprising:
a group of one or more classes of entities related to the domain of discourse;
attributes associated with each of the one or more classes of entities;
relationship information between each of the one or more classes of entities;
associated values for each of the one or more classes of entities;
language-related descriptions of each of the associated values; and
a description of how the language-related descriptions may be derived through logical inference;
organizing the ontological specification of a domain of discourse into a hierarchical format, wherein the hierarchical format comprises:
a first level of the hierarchical format comprises goals and knowledge;
a second level of the goals comprises start, greetings and place an order;
a second level of the knowledge comprises item, order and topping;
a third level of the knowledge and the item comprises pizza, salad and drink; and
a fourth level of the knowledge, item and pizza comprises size and topping;
creating a description of a group of top-level goals, capabilities and services provided by the ontological conversational agent, comprising:
identification of a first utterance of a user during a conversation which triggers a first goal of the group of top-level goals; and
identification of rules to achieve each goal of the group of top-level goals;
testing the ontological conversational agent; and
manually updating the ontological conversational agent based on the testing.

2. The processor-implemented method according to claim 1, further comprising:
receiving a first utterance from the user during the conversation;
identifying a first intent based on the first utterance; and
recognizing the first goal of the group of top-level goals, based on the first intent.

3. The processor-implemented method according to claim 2, further comprising:
retrieving one or more rules associated with the first goal; and
generating a first response to the user based on the first intent.

4. The processor-implemented method according to claim 3, further comprising:
identifying needed information based on the first utterance and the first goal; and
generating the first response to the user based on the needed information.

5. The processor-implemented method according to claim 4, further comprising:
receiving a second utterance from the user;
identifying a second intent based on the second utterance; and
recognizing a second goal of the group of top-level goals of the ontological conversational agent based on the second intent.

6. The processor-implemented method according to claim 5, further comprising:
retrieving one or more rules associated with the second goal;
identifying further needed information based on the second utterance and the second goal; and
generating a second response to the user based on the further needed information.

7. The processor-implemented method according to claim 6, further comprising:
receiving a third utterance from the user;
determining the second goal is accomplished;
determining the first goal is not accomplished; and
repeating the generation of the first response to the user.

8. The processor-implemented method according to claim 2, further comprising:
translating the first utterance to a language recognized by the ontological conversational agent.

9. The processor-implemented method according to claim 2, further comprising:
saving a conversation of user utterances and responses; and
determining a current goal of the group of top-level goals based on the saved conversation.

10. A computer program product for creating an ontological conversational agent, the computer program product comprising:
one or more computer-readable storage media and program instructions stored on the one or more computer-readable storage media, the program instructions executable by a computing system to cause the computing system to perform a method comprising:
creating an ontological specification of a domain of discourse for the ontological conversational agent, the ontological specification of a domain comprising:
a group of one or more classes of entities related to the domain of discourse;
attributes associated with each of the one or more classes of entities;
relationship information between each of the one or more classes of entities;
associated values for each of the one or more classes of entities;
language-related descriptions of each of the associated values; and
a description of how the language-related descriptions may be derived through logical inference;
organizing the ontological specification of a domain of discourse into a hierarchical format, wherein the hierarchical format comprises:
a first level of the hierarchical format comprises goals and knowledge;
a second level of the goals comprises start; greetings and place an order;

a second level of the knowledge comprises item, order and topping;
a third level of the knowledge and the item comprises pizza, salad and drink; and
a fourth level of the knowledge, item and pizza comprises size and topping;
creating a description of a group of top-level goals, capabilities and services provided by the ontological conversational agent, comprising:
identification of a first utterance of a user during a conversation which triggers a first goal of the group of top-level goals; and
identification of rules to achieve each goal of the group of top-level goals;
testing the ontological conversational agent; and
manually updating the ontological conversational agent based on the testing.

11. The computer program product according to claim 10, further comprising:
receiving a first utterance from the user during the conversation;
identifying a first intent based on the first utterance; and
recognizing the first goal of the group of top-level goals, based on the first intent.

12. The computer program product according to claim 11, further comprising:
retrieving one or more rules associated with the first goal; and
generating a first response to the user based on the first intent.

13. The computer program product according to claim 12, further comprising:
identifying needed information based on the first utterance and the first goal; and
generating the first response to the user based on the needed information.

14. The computer program product according to claim 13, further comprising:
receiving a second utterance from the user during the conversation between the ontological conversational agent and the user;
identifying a second intent based on the second utterance; and
recognizing a second goal of the group of top-level goals of the ontological conversational agent based on the second intent.

15. The computer program product according to claim 14, further comprising:
retrieving one or more rules associated with the second goal;
identifying further needed information based on the second utterance and the second goal; and
generating a second response to the user based on the further needed information.

16. The computer program product according to claim 15, further comprising:
receiving a third utterance from the user during the conversation between the ontological conversational agent and the user;
determining the second goal is accomplished;
determining the first goal is not accomplished; and
repeating the generation of the first response to the user.

17. The computer program product according to claim 11, further comprising:
translating the first utterance to a language recognized by the ontological conversational agent.

18. The computer program product according to claim 11, further comprising:
saving a conversation of user utterances and responses; and
determining a current goal of the group of top-level goals based on the saved conversation.

19. A computer system for creating an ontological conversational agent, the computer system comprising:
one or more computer processors, one or more computer-readable storage media, and program instructions stored on the one or more of the computer-readable storage media for execution by at least one of the one or more processors, wherein the computer system is capable of performing a method comprising:
creating an ontological specification of a domain of discourse for the ontological conversational agent, the ontological specification of a domain comprising:
a group of one or more classes of entities related to the domain of discourse;
attributes associated with each of the one or more classes of entities;
relationship information between each of the one or more classes of entities;
associated values for each of the one or more classes of entities;
language-related descriptions of each of the associated values; and
a description of how the language-related descriptions may be derived through logical inference;
organizing the ontological specification of a domain of discourse into a hierarchical format, wherein the hierarchical format comprises:
a first level of the hierarchical format comprises goals and knowledge;
a second level of the goals comprises start, greetings and place an order;
a second level of the knowledge comprises item, order and topping;
a third level of the knowledge and the item comprises pizza, salad and drink; and
a fourth level of the knowledge, item and pizza comprises size and topping;
creating a description of a group of top-level goals, capabilities and services provided by the ontological conversational agent, comprising:
identification of a first utterance of a user during a conversation which triggers a first goal of the group of top-level goals; and
identification of rules to achieve each goal of the group of top-level goals;
testing the ontological conversational agent; and
manually updating the ontological conversational agent based on the testing.

20. The computer system according to claim 19, further comprising:
receiving a first utterance from a user during a conversation;
identifying a first intent based on the first utterance; and
recognizing a first goal of the group of top-level goals, based on the first intent.

* * * * *